Nov. 1, 1966 R. J. SPADY 3,283,240
ELECTRICAL CONDUCTIVITY CELL AND MEASURING APPARATUS
Filed Oct. 22, 1962

INVENTOR.
RICHARD J. SPADY
BY Arthur H. Swanson
ATTORNEY.

United States Patent Office 3,283,240
Patented Nov. 1, 1966

3,283,240
ELECTRICAL CONDUCTIVITY CELL AND MEASURING APPARATUS
Richard J. Spady, Feasterville, Pa., assignor to Honeywell Inc., a corporation of Delaware
Filed Oct. 22, 1962, Ser. No. 232,118
7 Claims. (Cl. 324—30)

The present invention relates generally to apparatus for measuring the electrical conductivity of substances, of the type including a cell portion arranged to contact the substance and an energizing and measuring circuit portion connected thereto. Specifically, the invention relates to apparatus of this type wherein the substance conductivity is measured in terms of the voltage drop produced across a portion of the substance, between two output electrodes of the cell, by passing an electric current from said circuit portion through the substance between two energizing electrodes of the cell.

More specifically, the present invention relates to apparatus of the foregoing type wherein the conductivity of the substance is measured by automatically determining the value of said current which must be passed through the substance in order to maintain a predetermined value of voltage drop across said portion of the substance.

A general object of the present invention is to provide improved conductivity measuring apparatus of the type last specified which produces a measure of substance conductivity on a desirable linear scale basis. A specific object of the invention is to provide such improved apparatus which is characterized by its simplicity of construction, and by its accuracy and reliability of operation.

A more specific object of the invention is to provide improved apparatus as just specified including both a novel form for the energizing and measuring circuit portion, and a novel configuration for the structure of the cell portion.

Conductivity measuring apparatus of the general type referred to hereinbefore is well known in the electrical measurement art. However, all of the forms of such prior apparatus of which I am aware suffered from one or more disadvantages which are overcome by the teaching according to the present invention.

For example, the prior apparatus of which I am aware either did not provide a linear scale measure of conductivity, or else required and utilized relatively complex devices, such as magnetic amplifiers and attendant D.C. amplifiers. Additionally, the cell constructions of most of these prior arrangements were not such as to insure continued accuracy and reliability of measurement.

Thus, there has been a need for a relatively simple and reliable apparatus which would provide an accurate linear measure of conductivity. Such an apparatus is provided in accordance with the present invention.

To the end of fulfilling the foregoing and other desirable objects, the novel cell of the conductivity measuring apparatus according to the present invention includes a dual set of output electrodes and a pair of energizing electrodes, one of the latter advantageously surrounding and shielding the output electrodes. All of these electrodes are arranged to be in contact with the substance the conductivity of which is to be determined.

The novel circuit portion of this apparatus is advantageously a completely A.C. one, including a simple adjustable resistor for varying the flow of an alternating current between the energizing electrodes. The resulting A.C. conductivity signal produced between the output electrodes is applied in said circuit portion to the input of an A.C. signal amplifier in series with an opposing A.C. bias signal of a predetermined fixed value. The resulting A.C. output signal of the amplifier controls the rotation of an A.C. motor which is arranged to adjust the adjustable contact of said resistor. The motor adjusts the resistor contact and the value of said current as necessary to maintain the value of said conductivity signal equal to that of said bias signal, and hence as necessary to maintain the amplifier input and output signals substantially at zero. The adjusted position of the resistor contact is then a linear measure of the conductivity of the substance.

In the foregoing apparatus, the effects of capacitance between the conductors which connect the energizing electrodes of the cell to the remainder of the apparatus are minimized by causing said adjustable resistor to have a resistance which is low compared to the impedance of said conductors. Also, the effects of the resistance of these conductors is minimized by making the resistance of the energizing circuit at the cell high compared to the conductor resistance. Further, these conductors and the others connected to the cell are shielded in a desirable manner to minimize the effects of stray signals. Additionally, the effects of the temperature of the substance on the conductivity measurements made are corrected by the use of a temperature-sensitive resistor which is subjected to the substance temperature, and which is connected in the energizing circuit including the energizing electrodes.

A better understanding of the present invention may be had from the following detailed description of conductivity measuring apparatus embodying the invention, which description is to be read in connection with the accompanying drawings, wherein.

Figure 1:
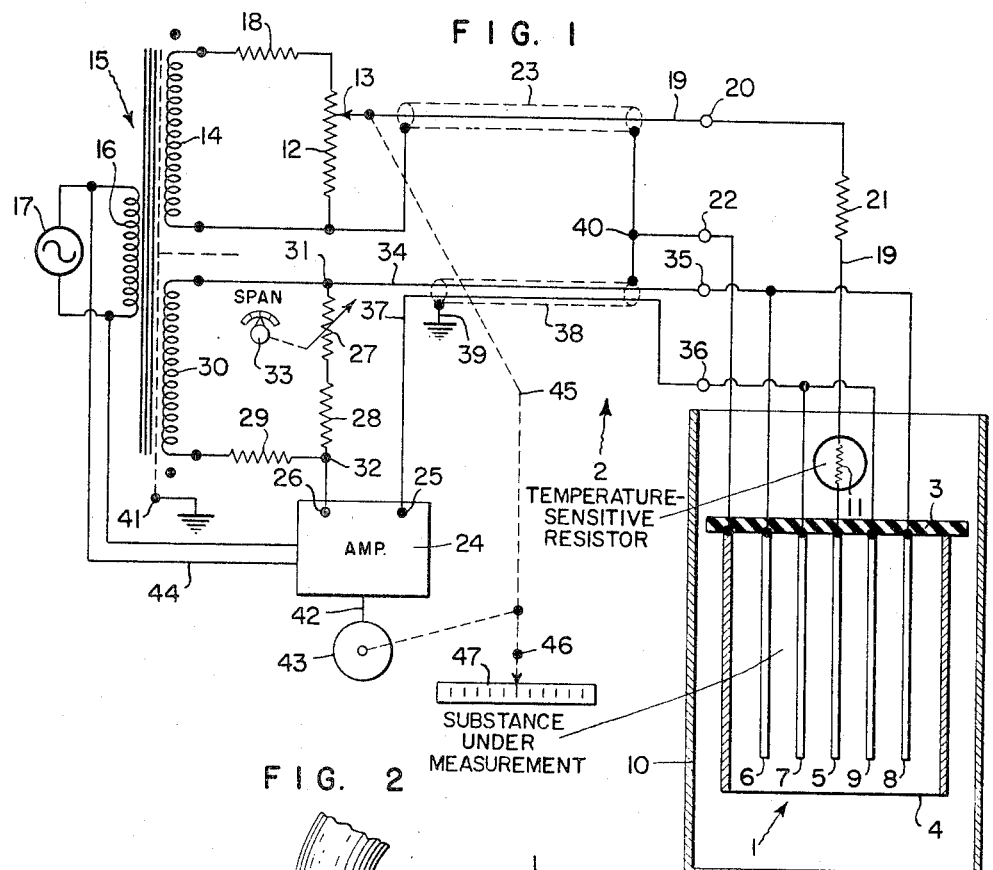
FIG. 1 is a schematic circuit diagram of said apparatus.

The conductivity measuring apparatus of FIG. 1 includes a cell portion 1 and an A.C. energizing and measuring circuit portion 2. The cell 1 includes an insulating member 3 whch supports the cell electrodes. These include a pair of energizing electrodes 4 and 5, a first pair of output electrodes 6 and 7, and a second pair of output electrodes 8 and 9. The electrodes 5 through 9 are rod shaped, while the electrode 4 is in the form of a hollow cylinder which surrounds the electrodes 5 through 9. As shown, the latter are located along a diameter of the cylindrical electrode 4. By placing the electrode 4 as shown, and by connecting it in the manner to be described hereinafter, the electrode 4 forms an electrical shield for the output electrodes, and thus prevents stray A.C. fields from reaching these electrodes.

The cell 1 is shown as being located within a container 10 which contains the substance the electrical conductivity of which is to be determined. Desirably, the cell is completely immersed in the substance within the container 10. Thus, the substance fills the cylindrical electrode 4 and is in contact with this electrode and with the other electrodes 5 through 9. Associated with the cell 1 and also located within the substance is a temperature-sensitive resistor 11 which is connected to provide a temperature compensation action as will be described more fully hereinafter.

The circuit portion 2 includes an energizing circuit part for the energizing electrodes 4 and 5, and a measuring circuit part for the output electrodes 6 through 9. The energizing circuit is supplied with a variable alternating current by an adjustable resistor 12 having an adjustable contact 13. The resistor 12 is connected to and energized from a secondary winding 14 of a transformer 15 which has its primary winding 16 connected to an A.C. source 17. Specifically, the resistor 12 is connected in series with a current-limiting resistor 18 across the winding 14.

The remainder of the energizing circuit can be traced from the resistor contact 13 through a conductor 19, a terminal 20, a resistor 21, and the temperature-sensitive resistor 11 to the energizing electrode 5, and from the other energizing electrode 4 through a terminal 22 and a conductive shield 23 for the conductor 19 back to the lower end of the resistor 12. Thus, an alternating energizing current is caused to flow through the substance between the energizing electrodes 4 and 5, the value of this current varying as the position of the contact 13 is varied along the resistor 12.

The measuring circuit includes the input of an A.C. amplifier 24 having input terminals 25 and 26, and includes a source of A.C. bias signal in the form of resistors 27, 28, and 29. These resistors are connected in series across, and energized from, a secondary winding 30 of the transformer 15. The bias signal appears between the upper end terminal 31 of the resistor 27 and the lower end terminal 32 of the resistor 28. The resistor 27 is desirably made adjustable, as by means of a setter 33, to permit the setting of the span of the apparatus.

The remainder of the measuring circuit can be traced from the bias terminal 31 through a conductor 34 and a terminal 35 to the output electrodes 6 and 8, and from the other output electrodes 7 and 9 through a terminal 36 and a conductor 37 to the amplifier input terminal 25. The circuit is completed by a connection between the other amplifier input terminal 26 and the other bias terminal 32.

Accordingly, the first pair of output electrodes 6 and 7 is connected to the input of the amplifier 24 in series with the bias resistors 27 and 28, and hence in series with the bias signal produced between the terminals 31 and 32. Similarly, the second pair of output electrodes 8 and 9 is also connected in series with the bias terminals 31 and 32 to the amplifier input, inasmuch as the electrodes 8 and 9 are effectively connected in parallel with the electrodes 6 and 7.

The conductors 34 and 37 are provided with a conductive shield 38 which is connected to apparatus ground at 39. As shown, the shield 38 also serves, by way of a junction 40, to ground the shielding energizing electrode 4 and the shield 23 of the conductor 19. The electrostatic shielding of the transformer 15 is also grounded, at a point 41. The particular shielding and grounding procedures illustrated have been found in practice to provide a desirable freedom from the effects of stray signals, thereby enhancing the accuracy and reliability of the measurements obtained with the apparatus.

The amplifier 24 is provided with an output connection 42 which supplies the A.C. output signal of the amplifier to a reversible A.C. motor 43. The amplifier 24 and motor 43 combination is supplied with energizing power from the source 17 by way of conductors 44, and may well be the A.C. input form of the apparatus disclosed and claimed in the Wills Patent No. 2,423,540 of July 8, 1947. It is sufficient to note herein, therefore, that the amplifier 24 energizes the motor 43 for rotation whenever, and as long as, an A.C. input signal is applied to the input terminals 25 and 26, the direction of motor rotation being dependent upon the phase of the input signal with respect to the energizing voltage of the conductors 44.

By means of a mechanical linkage 45, rotation of the shaft of the motor 43 is caused to move the contact 13 along the resistor 12. A pointer 46 coupled to the linkage 45 cooperates with a scale 47 to provide an indication of the position of the contact 13 along the length of the resistor 12. As will be explained more fully hereinafter, this contact and pointer position provides a linear measure of the conductivity of the substance in the container 10.

The passage of the alternating energizing current through the substance between the energizing electrodes 4 and 5 causes an A.C. voltage drop or conductivity signal to be produced between the first pair of output electrodes 6 and 7, and between the second pair of output electrodes 8 and 9. Since the action with respect to the electrode pair 8 and 9 is the same as that for the electrode pair 6 and 7 under normal conditions, the following description needs, and will, deal with only the electrodes 6 and 7.

The A.C. conductivity signal produced between the electrodes 6 and 7 is a function of both the magnitude of the energizing current and the magnitude of the substance conductivity, and is applied to the input of the amplifier 24 in series with the A.C. bias signal produced between the terminals 31 and 32. The bias signal has a predetermined fixed value which is set by means of the setter 33. Moreover, this bias signal is caused to be 180° out of phase with respect to the conductivity signal, whereby these two signals oppose each other in the amplifier input. This is accomplished by so connecting the transformer 15 that the dotted ends of the windings 14 and 30 have the same instantaneous polarity.

Whenever the conductivity signal is not equal to the opposing bias signal in the amplifier input, the apparatus is unbalanced, and the motor 43, under the control of the amplifier output signal, moves the contact 13 along the resistor 12 and hence varies the values of the energizing current and the conductivity signal until the value of the conductivity signal is made substantially equal to that of the opposing bias signal. At that time, the resultant amplifier input signal and corresponding amplifier output signal are reduced substantially to zero, the motor 43, contact 13, and pointer 46 are brought to rest, and the apparatus is brought to balance.

Thus, the motor 43 varies the energizing current automatically as necessary to keep the value of the conductivity signal equal to the predetermined value of the bias signal, and hence as necessary to maintain the apparatus in balance. As a result, the balance position of the pointer 46 along the scale 47 is proportional to the substance conductivity on a linear basis. Accordingly, the scale 47 can advantageously be linearly marked in units of conductivity. The scale and pointer will then provide a direct, linear measure or indication of the substance conductivity.

Since the cell 1 is usually located at some distance from the remainder of the apparatus, the shielded conductors 19, 34, and 37 are usually in the form of one or more cables which run between the cell and the remainder of the apparatus. The terminals 20, 22, 35, and 36 represent the point at which the conductors coming from the remainder of the apparatus are connected to the cell proper. In order to minimize any phase shift which might be produced between the conductivity and bias signals due to the capacitance of the energizing current conductors 19 and 23, the resistance of the resistor 12 is chosen so as to be low compared to the impedance of these conductors lying to the left of the terminals 20 and 22 in FIG. 1. This contributes to the accuracy of the measurements made by the apparatus, and makes it practical to employ an all-A.C. measuring system.

As was mentioned hereinbefore, the temperature-sensitive resistor 11 provides a temperature compensating or correcting action in the FIG. 1 apparatus. Specifically, variations in the temperature of the substance which change its conductivity also change the resistance of the resistor 11. The characteristics of the latter are so chosen that its change in resistance for a given change in substance temperature just offsets the resulting change in the substance conductivity. As a result, such temperature changes do not effectively change the net resistance of the energizing circuit. This causes the conductivity measurements made by the apparatus to be automatically referenced to a standard temperature, such as 77° F., as is the usual practice.

The purpose of the resistor 21 in the energizing circuit is to supplement the resistor 11 in providing accurate temperature correction, and in making the resistance of the energizing circuit at the cell, to the right of the terminals 20 and 22 in FIG. 1, high compared to the resistance of the conductors 19 and 23 to the left of the terminals 20 and 22. This latter action is desirable in that it minimizes the effects on the measurements made of changes in the last-mentioned resistance, due to changes in conductor length, etc. If the characteristics of the resistor 11 per se are such as to effect both of these actions satisfactorily, of course, the resistor 21 may be dispensed with.

The use of two pairs of output electrodes in the cell increases the reliability with which the apparatus makes its conductivity measurements. For example, if the electrode 5 should become fouled on its face adjacent the electrodes 6 and 7, thereby adversely affecting the energizing path adjacent these electrodes, the electrodes 8 and 9 would continue to provide accurate measurements.

Figure 2:
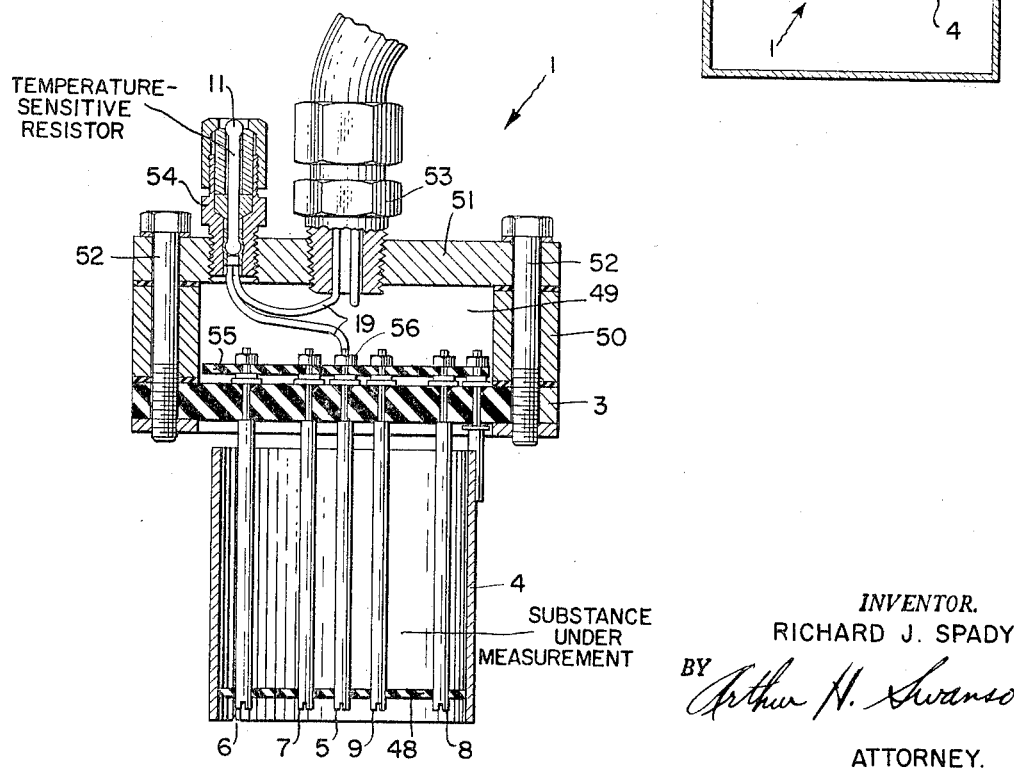
FIG. 2 is a detailed front elevation of the cell portion shown schematically in FIG. 1.

There are shown in FIG. 2 the details of a desirable form which the cell 1 of FIG. 1 may take. The cell construction of FIG. 2 includes the insulating member 3 which is desirably in the form of a disk, and on which the electrodes 4 through 9 are perpendicularly mounted. As shown, the rod-like energizing electrode 5 is disposed coaxially with respect to the hollow cylindrical energizing electrode 4, while the rod-like output electrodes 6 through 9 lie within the electrode 4 parallel to the electrode 5 and symmetrically displaced therefrom along a diameter of the electrode 4.

An additional insulating member 48 is placed in the electrode 4, near the lower end thereof as shown in FIG. 2, to support the electrodes 5 through 9 and to maintain them in their proper positions within the electrode 4. The member 3 forms the bottom member of a sealed cylindrical chamber 49 which is completed by a gasketed annular member 50 and a top disk member 51. The members 3, 50, and 51 are held together to form the chamber 49 by means of bolts 52. The top member 51 is provided with a threaded aperture for receiving a threaded fitting 53 by means of which the several cell conductors, such as the conductor 19, pass into the chamber 49. The fitting 53 anchors the conductors from being pulled out of the chamber 49, and also prevents entry of the substance into the chamber 49 when the cell 1 is immersed as shown in FIG. 1.

The resistor 11 is secured to the top member 51 by means of a fitting 54 which is threaded into the member 51. The fitting 54 also protects the resistor 11 from direct contact with the substance, while permitting the resistor to respond to the substance temperature.

The chamber 49 forms a space within which the electrodes 4 through 9 are connected to their respective conductors. In order to avoid undue complication of the drawings, only the connection of the conductor 19 to the central energizing electrode 5 is shown in FIG. 2. The connections to the electrodes are facilitated by the use of a terminal disk 55 through which each electrode projects and above which each electrode terminates in a threaded end portion provided with a terminal nut, such as the nut 56 on the electrode 5.

In conclusion, it is seen that the improved linear conductivity measuring apparatus according to the present invention is characterized by its simplicity, being a completely A.C. arrangement and requiring only a simple adjustable resistor and motor for the adjustment of the energizing current. If desired, of course, a suitably low resistance variable or adjustable transformer or other simple alternating current varying impedance element can be used in place of the resistor 12.

It is also seen that the invention apparatus is characterized by a high degree of accuracy and reliability of operation, due, for example, to the use of a resistor 12 of relatively low resistance, the provision of the shielding for the cell conductors, the use of the electrode 4 as a shielding member, the provision of the temperature-sensitive resistor 11, and the provision of the dual set of cell output electrodes 6–7 and 8–9.

What is claimed is:

1. Apparatus for measuring the electrical conductivity of a substance, comprising a cell having a pair of energizing electrodes and a pair of output electrodes, said electrodes being arranged to contact said substance, adjustable current varying means connected in an energizing circuit between a source of alternating current and said energizing electrodes to apply to said circuit an adjustable percentage of the voltage of said source to produce a variable alternating current in said circuit which in turn produces an alternating current signal between said output electrodes, said current varying means including an impedance element connected across said source and having an adjustable member the adjustment of which adjusts said percentage of the voltage of said source which is applied to said circuit and hence adjusts the value of said current in said circuit, an alternating current amplifier having an input connected to said output electrodes to receive said signal and having an output in which an alternating current output signal is produced, control means connected to said amplifier output and responsive to said output signal therein, and connected to adjust said member to vary the current in said energizing circuit in response to said output signal, and means mechanically coupled to and adjusted with said member to display the adjusted position thereof, and hence the percentage of the voltage of said source which is applied to said circuit, as a linear measure of the conductivity of said substance.

2. Apparatus as specified in claim 1, wherein said energizing circuit includes temperature sensitive impedance means responsive to the temperature of said substance to vary the impedance of said energizing circuit in accordance with said temperature.

3. Apparatus as specified in claim 1, wherein the connection of said amplifier input to said output electrodes includes a source of alternating current bias signal which opposes said signal from said output electrodes and which is proportional to the voltage of said source, and wherein said current varying means adjusts said current to the value at which the resultant signal applied to said amplifier input, and hence said output signal, are reduced substantially to zero.

4. Apparatus for measuring the electrical conductivity of a substance, comprising a cell having a pair of energizing electrodes and a pair of output electrodes, said electrodes being arranged to contact said substance, an amplifier having an input connected to said output electrodes and having an output, mechanically adjustable voltage varying means connected between a source of voltage and said energizing electrodes to apply to said energizing electrodes an adjustable percentage of the voltage of said source, said voltage varying means including an adjustable member the adjustment of which adjusts said percentage of the voltage of said source which is applied to said energizing electrodes, motor means connected to and energized from said amplifier output and coupled to adjust said member, and means mechanically coupled to and adjusted with said member to repeat the adjusted position thereof, and hence the percentage of the voltage of said source which is applied to said energizing electrodes, as a linear measure of the conductivity of said substance.

5. A cell for use in measuring the electrical conductivity of a substance, comprising an electrical insulating member, a first energizing electrode in the form of a hollow cylinder mounted on said member substantially perpendicular thereto and arranged to contain said substance, a second energizing electrode in the form of a rod mounted on said member coaxially with respect to said first electrode and contained at least partly therewithin, and third, fourth, fifth, and sixth electrodes in the form of rods mounted on said member and extending substantially entirely within said first electrode parallel to said second electrode and symmetrically displaced therefrom along a diameter of said first electrode, said third and fourth electrodes constituting a first pair of output electrodes disposed on one side of said second electrode, said fifth and sixth electrodes constituting a second pair of output electrodes disposed on the opposite side of said second electrode, and said first electrode forming a shield for said pairs of electrodes.

6. Apparatus for measuring the electrical conductivity of a substance, comprising a cell having an electrical insulating member, a first energizing electrode in the form of a hollow cylinder mounted on said member substantially perpendicular thereto and arranged to contain said substance, a second energizing electrode in the form of a rod mounted on said member coaxially with respect to said first electrode and contained at least partly therewithin, and third, fourth, fifth, and sixth electrodes in the form of rods mounted on said member and extending substantially entirely within said first electrode parallel to said second electrode and symmetrically displaced therefrom along a diameter of said first electrode, said third and fourth electrodes constituting a first pair of output electrodes disposed on one side of said second electrode, said fifth and sixth electrodes constituting a second pair of output electrodes disposed on the opposite side of said second electrode, and said first electrode forming a shield for said pairs of electrodes, an impedance element arranged for connection across a source of energizing current, said element having a contact adjustable therealong, conductors connecting one of said energizing electrodes to said contact and the other of said energizing electrodes to one end of said element, an amplifier having an input and an output, a pair of terminals arranged for connection across a source of opposing bias signal, conductors connecting said terminals and said third and fourth electrodes in a series circuit to said amplifier input, conductors connecting said fifth and sixth electrodes to said third and fourth electrodes, respectively, and a motor connected to and energized from said amplifier output and coupled to said contact to adjust the latter along said element to the position at which said motor becomes deenergized, said position being a measure of the conductivity of said substance.

7. In electrical conductivity measuring apparatus including a cell having a pair of energizing electrodes and a pair of output electrodes, said electrodes being arranged to contact a substance the electrical conductivity of which is to be measured, the improvement comprising an amplifier having an input connected to said output electrodes and having an output, mechanically adjustable voltage varying means connected between a source of voltage and said energizing electrodes to apply to said energizing electrodes an adjustable percentage of the voltage of said source, said voltage varying means including an adjustable member the adjustment of which adjusts said percentage of the voltage of said source which is applied to said energizing electrodes, motor means connected to and energized from said amplifier output and coupled to adjust said member, and means mechanically coupled to and adjusted with said member to repeat the adjusted position thereof, and hence the percentage of the voltage of said source which is applied to said energizing electrodes, as a linear measure of the conductivity of said substance.

References Cited by the Examiner

UNITED STATES PATENTS

| | | | |
|---|---|---|---|
| 2,470,153 | 5/1949 | Feller | 324—30 |
| 2,854,626 | 9/1958 | Davidson et al. | 324—64 |

WALTER L. CARLSON, *Primary Examiner.*

C. F. ROBERTS *Assistant Examiner.*